(12) United States Patent
Fujihara et al.

(10) Patent No.: US 7,894,154 B2
(45) Date of Patent: Feb. 22, 2011

(54) METHOD AND SYSTEM FOR IMPROVING DATA ACCESS TIME

(75) Inventors: Shinobu Fujihara, Kanagawa-ken (JP); Takashi Katagiri, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 37 days.

(21) Appl. No.: 12/268,578

(22) Filed: Nov. 11, 2008

(65) Prior Publication Data

US 2010/0118430 A1    May 13, 2010

(51) Int. Cl.
*G11B 15/18* (2006.01)
(52) U.S. Cl. .................................. 360/72.2; 360/69
(58) Field of Classification Search .................. None
See application file for complete search history.

(56) References Cited

U.S. PATENT DOCUMENTS 7,398,351 B2 * 7/2008 Jaquette et al. ............. 711/111
2004/0044641 A1 * 3/2004 Saliba ........................... 707/1
2007/0136517 A1 * 6/2007 Edling ........................ 711/111

FOREIGN PATENT DOCUMENTS

| JP | 2003536195 | 12/2003 |
|----|------------|---------|
| WO | 0195331 A2 | 12/2003 |

* cited by examiner

*Primary Examiner*—Andrew L Sniezek
(74) *Attorney, Agent, or Firm*—Cantor Colburn LLP; Jennifer Anda

(57) ABSTRACT

A computer implemented method of writing data to a linear tape is provided and includes, of the data to be written to the linear tape, distinguishing between data and meta-information, writing both the distinguished meta-information and undistinguished meta-information to a data area of the linear tape and the distinguished meta-information to a reserved area at a leading end of the linear tape, and retaining information reflective of the meta-information and a location thereof in a specified position of the reserved area.

20 Claims, 4 Drawing Sheets

METHOD AND SYSTEM FOR IMPROVING DATA ACCESS TIME

BACKGROUND

Aspects of the present invention are directed to an apparatus and a method for improving data access time and, more particularly, to an apparatus and a method for improving data access time by way of a rewriting of certain meta data.

In currently operating computing systems, when a large amount of contents, such as data, are handled, meta information assumes a relatively important role in managing the contents. Meta information can be generally defined as information that describes a kind and/or a type of information of the contents. The importance of the meta information stems, therefore, from at least the fact that, when meta information is not present, finding particularly desired contents can be difficult.

Typically, meta information and data to which the meta information relates are separately managed by different management systems. In these cases, if the management systems include separate physical media, such as tapes, a problem exists in that, with data and associated meta information stored on physically distributed tapes, if either of the tapes or their respective managing systems fail, it can be difficult to otherwise secure compatibility in system management by, e.g., moving the data or the meta information to another site.

As such, it is generally desirable to provide a system in which data and associated meta information are stored on the same tapes. However, in these systems, it is also necessary to insure that the data and the meta information can be accessed relatively quickly.

SUMMARY

In accordance with an aspect of the invention, a computer implemented method of writing data to a linear tape is provided and includes, of the data to be written to the linear tape, distinguishing between data and meta-information, writing both the distinguished meta-information and undistinguished meta-information to a data area of the linear tape and the distinguished meta-information to a reserved area at a leading end of the linear tape, and retaining information reflective of the meta-information and a location thereof in a specified position of the reserved area.

In accordance with another aspect of the invention, a computer implemented method of reading/locating data written to a linear tape is provided and includes receiving, at a processing unit of the computer, a command to read/locate the data written to the linear tape, determining whether the command relates to meta-information, in an event the command does not relate to meta-information, moving a read head of the drive to a data area of the linear tape, in an event the command relates to meta-information, recognizing whether a location of the meta-information in a reserved area of the linear tape can be discerned, in an event the location cannot be discerned, moving the read head to the data area of the linear tape and, in an event the location can be discerned, moving the read head to the location in the reserved area of the linear tape.

In accordance with another aspect of the invention, a computing system for reading/locating data on a linear tape is provided and includes a drive, including a read head, into which the linear tape, on which meta-information is stored in a reserved area and user data is stored in a data area, is loaded, and a processing unit to receive a read/locate command with respect to the linear tape, to determine whether the read/locate command relates to meta-information, to control a movement of the read head to the data area in an event the command is not related to meta-information and to recognize whether a location within the reserved area of the meta-information can be discerned in an event the command relates to meta-information, wherein, in an event the location cannot be discerned, the processing unit moves the read head to the data area and, in an event the location can be discerned, the processing unit moves the read head to the location within the reserved area.

BRIEF DESCRIPTIONS OF THE SEVERAL VIEWS OF THE DRAWINGS

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION

Access time for accessing meta-information stored on a linear tape is reduced. Generally, when a cartridge retaining the linear tape is loaded with respect to a drive of a computer, accessing data near the leading end of the linear tape may be accomplished quickly. Thus, if meta-information is located in near the leading end of the linear tape, it is possible to achieve relatively fast performance in accessing operations.

Figure 1:
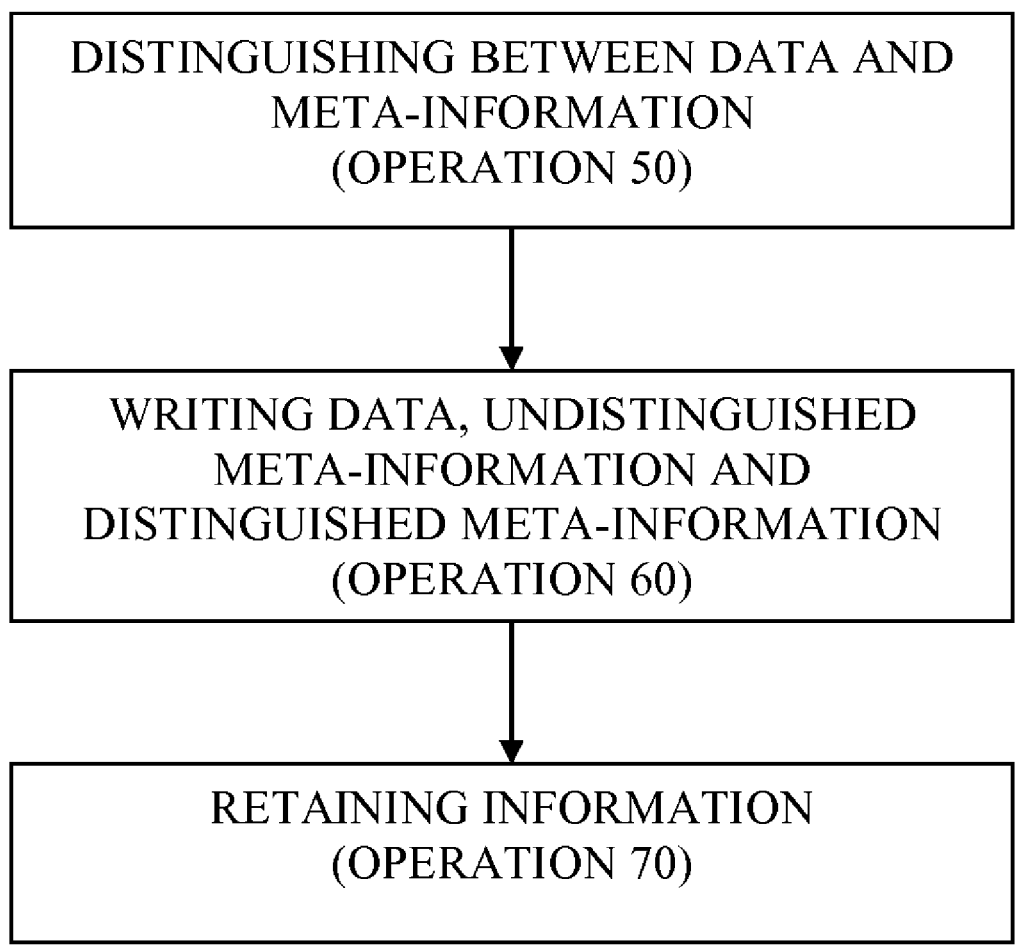
FIG. 1 is a flow diagram illustrating an exemplary computer implemented method of writing data in accordance with embodiments of the invention.

In accordance with an aspect of the invention, with reference to FIG. 1, a computer implemented method of writing data to a linear tape is provided. The method includes, of the data to be written to the linear tape, distinguishing between data and meta-information (operation 50), writing both the distinguished meta-information and undistinguished meta-information (user data) to a data area of the linear tape and the distinguished meta-information to a reserved area of the linear tape (operation 60), and retaining information reflective of the meta-information and a location thereof in a specified position of the reserved area (operation 70).

In accordance with embodiments of the invention, the writing of operation 60 is accomplished once at the time of operation 60. However, with the linear tape being retained within a cartridge that is inserted within a tape drive of a computer, the writing of the meta-information to the reserved area of the linear tape may be repeated upon removal of the cartridge from the tape drive.

In this way, it is seen that both data, such as user data, and meta-information are written in the data area of the linear tape (i.e., the normal data area of the linear tape) once. Meanwhile, the drive maintains the meta-information in a drive buffer and discards the data, such as the user data. Subsequently, when the cartridge is unloaded (or a wrap turn is conducted at the leading end), the meta-information may be written in the reserved area again.

Figure 2:
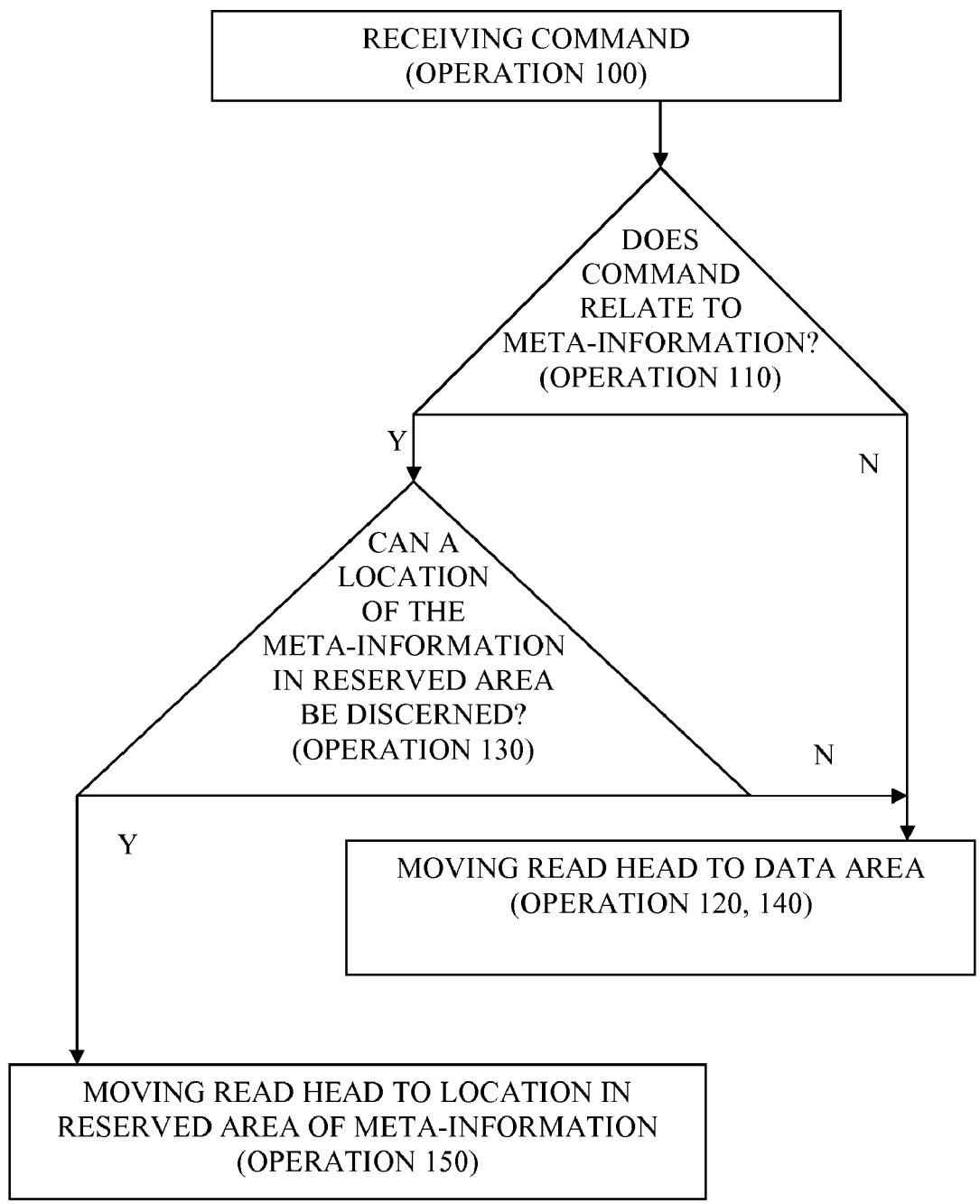
FIG. 2 is a flow diagram illustrating an exemplary computer implemented method of reading/locating data in accordance with embodiments of the invention.

With reference to FIG. 2, a computer implemented method of reading/locating data written to a linear tape is provided and includes receiving, at a processing unit of the computer, a command to read/locate the data written to the linear tape (operation 100), determining whether the command relates to meta-information (operation 110), in an event the command does not relate to meta-information, moving a read head of the drive to a data area of the linear tape (operation 120), in an event the command relates to meta-information, recognizing whether a location of the meta-information in a reserved area of the linear tape can be discerned (operation 130), in an event the location cannot be discerned, moving the read head to the data area of the linear tape (operation 140) and, in an event the location can be discerned, moving the read head to the location in the reserved area of the linear tape (operation 150).

Here, the determining of operation 110 includes an analyzing of the command so as to detect whether a data pattern of the information to which the command relates is associated with meta-information. To this end, in particular, a string search function can be applied to the received command. A string search is a mechanism that allows for a pre-compression detection of a specific data pattern within information that allows for at least a detection of where meta-information starts and ends.

Figure 3:
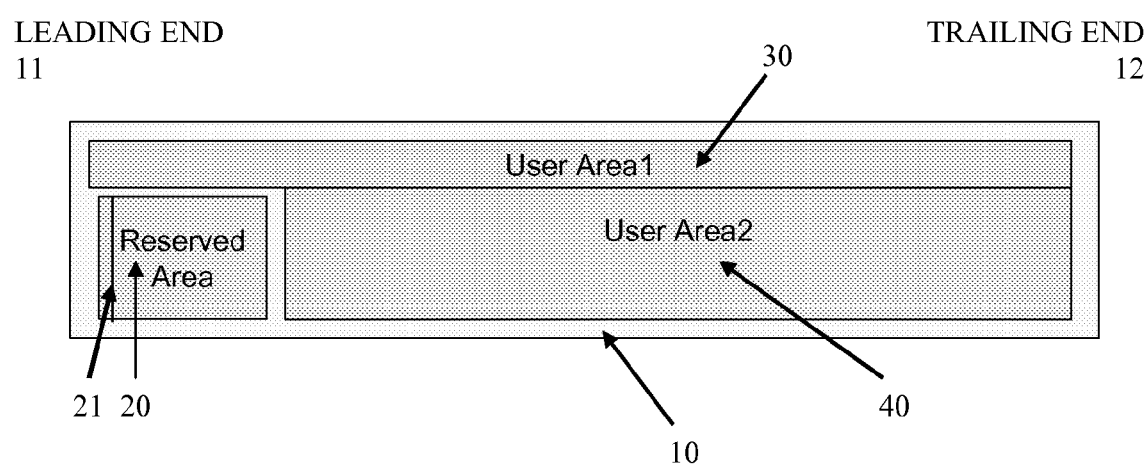
FIG. 3 is a schematic diagram of an exemplary linear tape in accordance with embodiments of the invention.

As shown in FIG. 3, the reserved area 20, including a specified portion 21 thereof, of the linear tape 10 is located at a leading end 11 of the linear tape 10. A first data area 30 is, for a length of the reserved area 20, adjacent to the reserved area 20 and, thereafter, extends from the leading end 11 to a trailing end 12 of the linear tape 10. A second data area 40 trails the reserved area 20 by a preselected distance and extends, adjacent to the first data area, to the trailing end 12. Of course, it is understood that this configuration is merely exemplary and that the configuration of the linear tape 10 need not be provided as described above.

Figure 4:
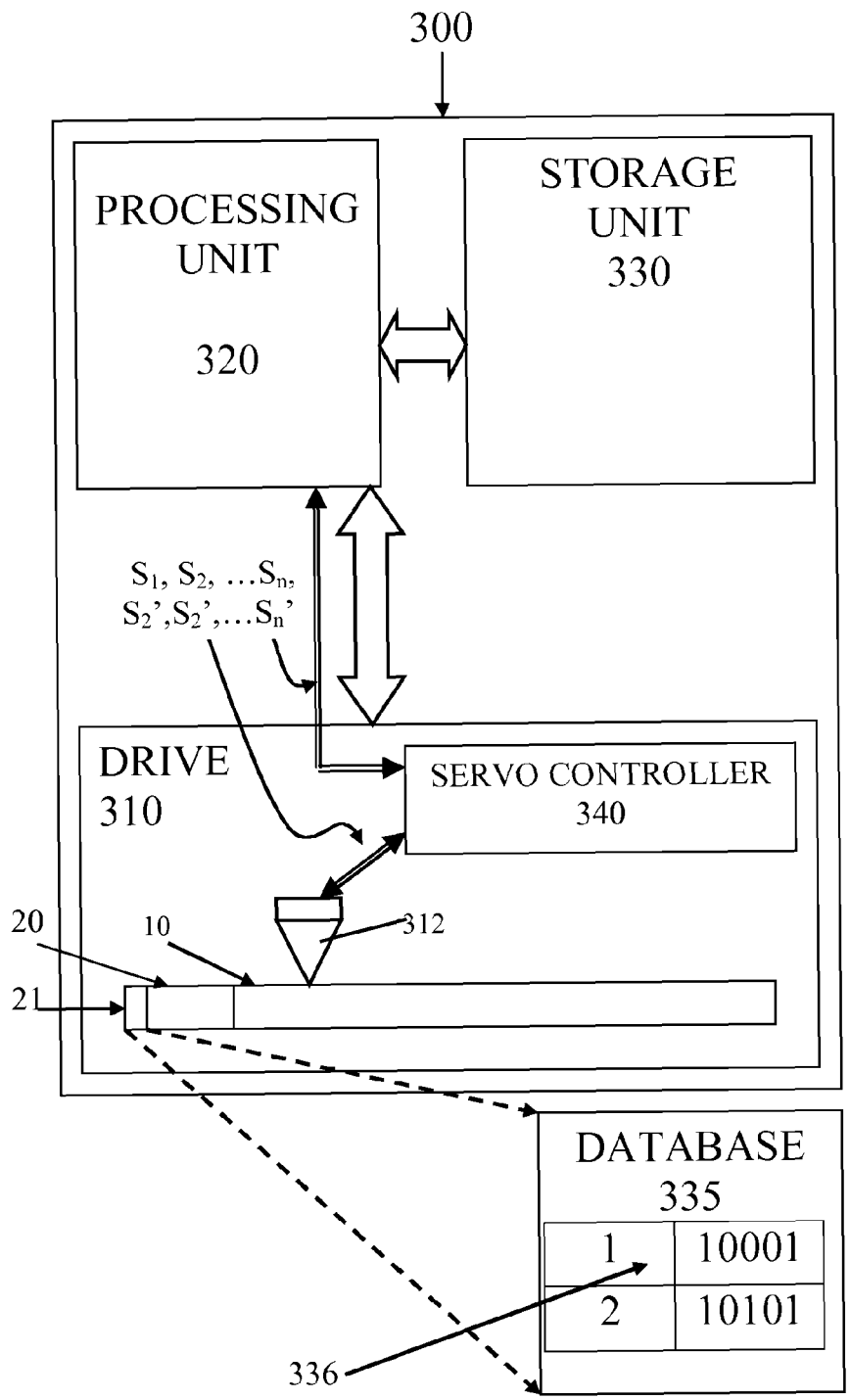
FIG. 4 is a schematic diagram of an exemplary computing system in accordance with embodiments of the invention.

With reference to FIG. 4, in accordance with yet another aspect of the invention, a computing system 300 for reading/locating data stored on a linear tape is provided. The system 300 includes a drive 310, including a read head 312, which may be further configured as a write head as well, into which a linear tape, such as the linear tape 10 of FIG. 3, on which meta-information is stored in a reserved area 20 and user data is stored in a data area 30, 40, is loaded. The system 300 further includes a processing unit 320, which is configured to receive a command to read/locate information of the linear tape 10 and to determine whether the information to be read/located is meta-information or not. The processing unit 320 is further configured to control a movement of the read head 312 to cause the read head 312 to move to the data area 30 or 40 in an event the information to be read/located is not meta-information. Conversely, if the information is meta-information, the processing unit 320 recognizes whether a location of the meta-information in the reserved area 20 on the linear tape 10 can be discerned.

In an event the location in the reserved area 20 on the linear tape 10 of the meta-information cannot be discerned, the processing unit 320 moves the read head 312 to the data area 30 or 40 of the linear tape 10. However, in an event the location of the meta-information in the reserved area 20 can be discerned, the processing unit 320 moves the read head 312 to the discerned location.

The movement of the read head 312 by the processing unit 320 is enabled by a servo controller 340 installed in the drive 310 and disposed in signal communication with the read head 312 and the processing unit 320. The servo controller 340 operates in accordance with known methods in that control signals $S_1, S_2, \ldots S_n$ are read from the linear tape 10 and transmitted to the servo controller 340 and the processing unit 320 where they are interpreted such that servo control signals $S_1', S_2', \ldots S_n'$ can be generated and subsequently employed to drive the movement of the read head 312 accordingly.

The system 300 further includes a storage unit 330 which is accessible by the processing unit 320. The storage unit 330 may include various types of data storage and memory devices, such as random access memory (RAM) and read-only memory (ROM).

The location of the meta-information in the reserved area 20 may be stored in the specified portion 21 of the reserved area, on which a database 335 is provided. The database 335 includes a house keeping data set (HKDS) 336. In accordance with embodiments of the invention, the HKDS is configured to be reflective of the location information of the meta-information in the reserved area 20 of the linear tape 10. That is, the HKDS 336 includes a table relating the location information to a record number of the meta-information. The HKDS 336 is populated when a cartridge, including the linear tape 10, is loaded and/or unloaded to and/or from the system 300, when the reserved area 20 is full, and when a wrap and turn is conducted with respect to the linear tape 10. Thus, it is seen that, when the cartridge is loaded, the drive 310 reads the HKDS first, and thereby obtains location information for the meta-information.

Of course, it is understood that the HKDS may be stored in the drive 310. However, in this case, since the drive 310 needs to be able to handle a relative large number of cartridges, the drive 310 will need to store an HKDS for each cartridge.

In accordance with the methods and systems described above, it is understood that some data that is written in the data area 30 and 40 may also be written in the reserved area 20. Thus, in these cases, a total amount of data that can be written on the linear tape 10 decreases. However, when an amount of the meta-information is smaller than that of the data written in the first and second data areas 30 and 40, this decrease is negligible.

In addition, it is noted that deterioration in performance caused by meta-information written when a cartridge is unloaded can be ignored almost completely if only a rear portion of the reserved area 20 is used. This is due to the fact that the linear tape 10 is wound in the backward direction for the cartridge to be unloaded, and, even though data is written at this time, the time it takes to wind the linear tape 10 does not change considerably.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

What is claimed is:

1. A computer implemented method of writing and reading data to and from a linear tape, the method comprising:
of the data to be written to the linear tape, distinguishing between data and meta-information;
writing both the distinguished meta-information and undistinguished meta-information to a data area of the linear tape and the distinguished meta-information to a reserved area at a leading end of the linear tape;

retaining information reflective of the distinguished meta-information and a location thereof in a specified position of the reserved area;

recognizing whether the distinguished meta-information location can be discerned upon receipt of a command to read the meta-information; and moving a read head to the distinguished meta-information location in an event the location can be discerned and moving the read head to the data area of the linear tape in an event the distinguished meta-information location cannot be discerned.

2. The method according to claim 1, wherein the writing is accomplished once.

3. The method according to claim 1, wherein the linear tape is retained within a cartridge inserted within a tape drive of a computer and the writing of the distinguished meta-information to the reserved area of the linear tape is repeated upon removal of the cartridge from the tape drive.

4. A computer implemented method of reading/locating data written to a linear tape, the method comprising:

receiving, at a processing unit of the computer, a command to read/locate the data written to the linear tape;

determining whether the command relates to meta-information;

in an event the command does not relate to meta-information, moving a read head of the drive to a data area of the linear tape;

in an event the command relates to meta-information, recognizing whether a location of the meta-information in a reserved area of the linear tape can be discerned;

in an event the location cannot be discerned, moving the read head to the data area of the linear tape and;

in an event the location can be discerned, moving the read head to the location in the reserved area of the linear tape.

5. The method according to claim 4, wherein the reserved area is located at a leading end of the linear tape.

6. The method according to claim 5, wherein the determining comprises analyzing the received command.

7. The method according to claim 5, wherein the determining comprises detecting a data pattern of the data to be read/located.

8. The method according to claim 5, wherein the recognizing comprises accessing a specified position of the reserved area where location information is stored.

9. The method according to claim 8, wherein a house keeping data set (HKDS) that is reflective of the location information is stored at the specified position.

10. The method according to claim 9, wherein the HKDS comprises a table relating the location information to a record number of the meta-information.

11. The method according to claim 8, wherein the location information is stored when a cartridge, including the linear tape, is loaded and/or unloaded, when the reserved area is full, and when a wrap and turn is conducted with respect to the linear tape.

12. A computing system for reading/locating data on a linear tape, comprising:

a drive, including a read head, into which the linear tape, on which meta-information is stored in a reserved area and user data is stored in a data area, is loaded; and a processing unit to receive a read/locate command with respect to the linear tape, to determine whether the read/locate command relates to meta-information, to control a movement of the read head to the data area in an event the command is not related to meta-information and to recognize whether a location within the reserved area of the meta-information can be discerned in an event the command relates to meta-information, wherein, in an event the location cannot be discerned, the processing unit moves the read head to the data area and, in an event the location can be discerned, the processing unit moves the read head to the location within the reserved area.

13. The system according to claim 12, wherein the reserved area is located at a leading end of the linear tape.

14. The system according to claim 12, wherein the processing unit is configured to analyze the command.

15. The system according to claim 12, wherein the processing unit is configured to detect a data pattern of information to which the command relates.

16. The system according to claim 12, wherein location information of the meta-information is stored in a specified area of the reserved area.

17. The system according to claim 16, wherein a house keeping data set (HKDS) that is reflective of the location information is stored in the specified area.

18. The system according to claim 17, wherein the HKDS comprises a table relating the location information to a record number of the meta-information.

19. The system according to claim 16, wherein the location information is stored when a cartridge, including the linear tape, is loaded and/or unloaded, when the reserved area is full, and when a wrap and turn is conducted with respect to the linear tape.

20. The system according to claim 12, wherein the processing unit is further configured to search for meta-information in the data area in the event the location cannot be discerned and the read head is moved thereto.

* * * * *